United States Patent [19]

Oprescu et al.

[11] Patent Number: 5,325,355
[45] Date of Patent: Jun. 28, 1994

[54] METHOD AND APPARATUS FOR IMPLEMENTING A COMMON MODE LEVEL SHIFT IN A BUS TRANSCEIVER INCORPORATING A HIGH SPEED BINARY DATA TRANSFER MODE WITH A TERNARY CONTROL TRANSFER MODE

[75] Inventors: Florin Oprescu, Sunnyvale; Roger V. Brunt, San Francisco, both of Calif.

[73] Assignee: Apple Computer, Inc., Cupertino, Calif.

[21] Appl. No.: 34,561

[22] Filed: Mar. 19, 1993

[51] Int. Cl.$^5$ .............................................. H04B 1/56
[52] U.S. Cl. .................................... 370/24; 370/85.1; 375/17
[58] Field of Search ............... 370/85.1, 24, 26, 27, 370/32, 31, 25, 33, 34, 36, 103; 375/7, 17, 8, 20, 36

[56] References Cited

U.S. PATENT DOCUMENTS

| | | | |
|---|---|---|---|
| 4,152,541 | 5/1979 | Yuen | 370/27 |
| 4,393,494 | 7/1983 | Belforte et al. | 370/27 |
| 4,637,012 | 1/1987 | Crabbe, Jr. | 375/7 |
| 5,084,637 | 1/1992 | Gregor | 375/7 |
| 5,182,745 | 1/1993 | Heichler | 370/85.1 |
| 5,216,667 | 6/1993 | Chu et al. | 370/24 |
| 5,220,211 | 6/1993 | Christopher et al. | 370/85.1 |

*Primary Examiner*—Douglas W. Olms
*Assistant Examiner*—Chau T. Nguyen
*Attorney, Agent, or Firm*—Blakely, Sokoloff, Taylor & Zafman

[57] ABSTRACT

The present invention provides a bus transceiver incorporating a high speed, binary transfer mode for the half-duplex transfer of data signals with a ternary control transfer mode having a full duplex dominant logic transmission scheme for the full duplex transfer of control signals. In one embodiment of the present invention, the above-noted transfer modes are implemented in a bus architecture which includes at least a first communications node coupled to a second communications node via a twisted pair, serial bus. Each node comprises first transceiver and second transceivers having a differential driver for driving on the bus signal states comprising first and second signal states having equal current amplitudes opposite in sign and a third signal state having approximately a zero current amplitude, a high speed binary receiver for receiving high speed data signals during data transfer phases and a ternary receiver for receiving control signals during control transfer phases. To permit the receivers of the present invention to receive the transmitted signals at the amplitude required to detect the proper bus voltage values, the present invention further provides a means for common mode shifting of the signals at the front end of the receivers while providing for a voltage offset independent of the fabrication process. This common mode shifting means also permits the implementation of a single ternary receiver in place of each of the binary, ternary and preemptive signaling receivers for each transceiver. In this manner, the present invention can be modified so that both transfer modes in addition to the preemptive signaling method can be performed using a single ternary receiver.

28 Claims, 3 Drawing Sheets

METHOD AND APPARATUS FOR IMPLEMENTING A COMMON MODE LEVEL SHIFT IN A BUS TRANSCEIVER INCORPORATING A HIGH SPEED BINARY DATA TRANSFER MODE WITH A TERNARY CONTROL TRANSFER MODE

BACKGROUND OF THE INVENTION

Field of the Invention

The present invention relates to a bus architecture communications scheme for enabling baseband data communications between a plurality of interconnected devices or nodes in a computer system, and more particularly, to a bus transceiver incorporating a high speed, binary transfer mode with a low speed, ternary control transfer mode having a full duplex dominant logic scheme for bi-directional, simultaneous signal transfer.

Hereinafter, all computer devices will be referred to as "nodes" for simplicity irregardless of whether or not the specific device has a higher intelligence otherwise known as a "local host". In addition, the term local host will be used irregardless of whether or not it comprises hardware or hardware and software.

Nodes within a computer system, such as a disk drive, a CRT, a printer and the like, need the ability to convey signals between themselves. In the past, this has been accomplished by means of a standard I/O bus which comprises a plurality of transmission lines or channels and acts as a shared communications path for interconnecting several nodes in the system. In such a system, it is desirable to provide a bus architecture in which signals can be simultaneously transmitted between nodes connected to the bus in order to increase the volume of information that can be transmitted in a given time period, thereby increasing the over-all speed of the computer. This type of transmission is known as full-duplex transmission. In conventional bus architectures, however, a signal transmitted on the bus by a particular node is available for reception by all other nodes attached to the bus so that if two or more signals were simultaneously transmitted on the bus, they would superimpose to create a garbled signal un-intelligible to any node.

In conventional baseband data communication systems, this problem has been partially overcome by the following two techniques. The first technique is known as time duplexing wherein a plurality of nodes connected to a shared I/O bus are individually given a specific allotment of time to transmit their signals on the bus. This type of transmission resembles a round robin procedure in which each node is sequentially given access to the bus. A major drawback with the use of time duplexing on a shared bus is that it requires a general synchronization system to sequentially enable the driver of each node for a certain time, and even then, the over-all transmission is slow since the signals are still individually transmitted. Furthermore, this type of transmission is not bi-directional (i.e., full duplex) so that a node which requests information from another node must wait until the second node is given its turn to transmit the desired information.

The second technique consists of providing a bus which has at least two transmission lines for each interconnection between nodes coupled to the bus so as to enable full duplex transmission between any two of the nodes. For example, if there are four nodes coupled to each other so as to form six interconnections, twelve transmission lines would be required. Although this technique solves the problems presented by the previous technique, it creates other problems relating to the physical size and complexity of the bus and the large amount of power required to drive the bus.

Furthermore, in prior art bus architectures, data transfer busses are commonly used for the transmission of baseband data signals between nodes directly coupled to each other via point-to-point interconnections or "links" forming the bus. In this type of bus, data signal transfers between nodes occur only occasionally when one node needs to request data from or transmit data to another node. Because the bus may idle for indefinitely long periods of time between successive data transfers, it is customary to put the bus in an idle state by disabling the drivers of adjacent nodes so as to reduce the power consumption that would otherwise occur.

One method of maintaining the bus in the idle state is to use bias circuits to actively bias the bus in one of two signal states (i.e., a binary 1 or 0 signal state), however, this approach still consumes a significant amount of power due to the current required to maintain these states. Another known method for use with a differential data transfer bus is to passively bias the bus through the use of low impedance, passive termination devices. However, the use of this method to maintain the bus idle state undermines the overall common mode rejection of a double terminated, differential bus. Hence, in order to maintain the bus idle state, prior art bus architectures have traditionally required either the utilization of large amounts of power or a sacrifice in the common mode rejection range of the bus.

More recently, however, another means for reducing the power consumption caused by the bus idle state was realized through the use of a third, low power signal state as the bus idle state. This third state, known as a Z signal state, has a signal amplitude half way between the two binary signal states such that the corresponding current amplitude (when driven on the bus) is nearly 0 mA. According to the present invention, it was realized that the use of an intermediate signal state having a current amplitude of approximately 0 mA for the bus idle state would not only cause a reduction in the power consumption by the bus during an idle state, but would also provide an additional signaling state for use in implementing a full-duplex transmission scheme on the bus. Although this third state has been used in burst mode, differential busses for reducing the power consumption during the bus idle state, it has not been utilized for the transfer of data on a bus.

In an attempt by Applicants to implement the Z signal state in a burst mode, differential bus, it was found that this state constituted a special problem due to the design of conventional binary receivers utilized in such busses for the detection of the binary signal states. Specifically, a naive implementation of the intermediate Z signal state on the bus using a conventional binary receiver causes unpredictable behavior and produces erroneous signals during the bus idle state. This is due to current fluctuations on the bus about the intermediate current amplitude of the Z signal state which causes the receiver to randomly switch states between the binary signal states. According to another implementation, Applicants utilized a hysteresis receiver having a hysteresis region around the current amplitude of the Z signal state to prevent the random oscillation. However, the use of a hysteresis receiver, while absolutely mandatory during the control signal transfer phase, represented a serious problem during the data signal transfer phase where the hysteresis receiver generated adverse duty cycle distortions during normal data transmissions.

Accordingly, it is an object of the present invention to provide a method and apparatus for a bus transceiver incorporating a high speed, binary data transfer mode with a ternary control transfer mode having a full duplex dominant logic transmission scheme for automatic determination of the preferred data signal transfer direction and for the exchange of other control and identification information.

Another object of the present invention is to provide a method and apparatus for the common mode shifting of the signals received by the bus transceiver of the present invention using a PNP level shifting circuit at the front end of each the high speed, binary receiver, the low speed, ternary receiver and the preemptive signaling receiver.

A further object of the present invention is to provide a method and apparatus for a bus transceiver incorporating a high speed, binary data transfer mode with a ternary transfer mode having a full duplex dominant logic transmission scheme using a single ternary receiver comprising two voltage comparators in addition to a PNP level shifting circuit at the front end of each comparator.

BRIEF SUMMARY OF THE INVENTION

The present invention provides a bus transceiver incorporating a high speed, binary transfer mode for the half-duplex transfer of data signals with a ternary control transfer mode having a full duplex dominant logic transmission scheme for the full duplex transfer of control signals. In one embodiment of the present invention, the above-noted transfer modes are implemented in a bus architecture which includes at least a first communications node coupled to a second communications node via a twisted pair, serial bus.

Each node comprises a first transceiver and a second transceiver such that one pair of twisted signal wires. interconnects the first transceiver of the first node with the second transceiver of the second node, and the second pair of twisted signal wires interconnects the first transceiver of the second node with the second transceiver of the first node. Both the first and second transceivers comprise a differential driver for driving differential signal states on the bus, a high speed binary receiver for receiving high speed data signals and a ternary receiver for receiving control signals. Furthermore, both of the second transceivers also include a preemptive signaling receiver for the detection of preemptive control messages which act to terminate the current data transfer phase upon receipt of the message.

With respect to the binary data transfer mode, the binary receivers comprise high speed receivers having a single voltage comparator for the reception of data signals. The voltage comparators translate the bus states into corresponding signal states during the data transfer mode. Since the high speed, binary data transfer mode is only half-duplex, an arbitration scheme having full duplex transmission capabilities is required to determine the preferred direction of the binary data transfer. This is performed by implementing a dominant logic scheme in the ternary receiver of each transceiver which provides the simultaneous transmission capability.

To permit the receivers of the present invention to receive the transmitted signals at the amplitude required to detect the proper bus voltage values, the present invention further provides a means for common mode shifting of the signals at the front end of the receivers while providing for a voltage offset independent of the fabrication process. In order to obtain the proper signal amplitudes required by the voltage comparators forming the receivers and to optimize the common mode performance of the bus, a common mode level shift is implemented at the front end of each receiver. This is performed by providing each receiver with a level shifting circuit wherein two PNP bipolar junction transistors are controlled by two current sources to implement a common mode voltage translator in front of the comparators.

The level shifting circuit also permits the implementation of a single ternary receiver in place of each of the binary, ternary and preemptive signaling receivers for each transceiver. In this manner, the present invention can be modified so that both transfer modes in addition to the preemptive signaling method can be performed using a single ternary receiver. During the ternary control transfer mode, the comparators of the ternary receivers detect the amplitude formed on the bus due to the simultaneous transmission of control signal states, whereas in the binary data transfer mode, the ratio between the current sources can be dynamically switched in order to utilize one comparator as the binary receiver and the other comparator as the preemptive signaling receiver.

According to a further embodiment of the present invention, a method and apparatus is provided for the full duplex transmission of arbitration signals in a particular multi-speed bus architecture having a plurality of nodes arbitrarily coupled together via a plurality of links to form an interconnected, multi-speed bus. Each node coupled to the interconnected, multi-speed serial bus comprises a physical channel interface chip (or "PHY") directly connected to the serial bus for the reception and transmission of control and data signals. Each node may also comprise a link layer chip (or "LLC") which transmits to and receives from the PHY both data and control signals via a fixed speed, variable size bus Y forming a scalable interface. With such an arrangement, the interconnected pairs of bus transceivers of the present invention are respectively utilized in adjacent nodes of the system. In this manner, the transmission of data signals between PHY's of adjacent nodes is performed using the binary transfer mode and the transmission of control signals is performed using the ternary transfer mode as described above.

BRIEF DESCRIPTION OF THE DRAWINGS

The objects, features and advantages of the present invention will become apparent from the following detailed description in which.

DETAILED DESCRIPTION OF THE INVENTION

The present invention relates to a method and apparatus for a bus transceiver incorporating a high speed, binary transfer mode with a ternary control transfer mode having a full duplex dominant logic transmission scheme. In the following description, numerous details are set forth such as device speeds, device types, operating modes, etc., in order to provide a thorough understanding of the present invention. It will be obvious to one skilled in the art, however, that these details are not required to practice the present invention. In other instances, well-known circuits, devices, methods and the like are not set forth in detail in order to avoid unnecessarily obscuring the present invention.

Figure 1:
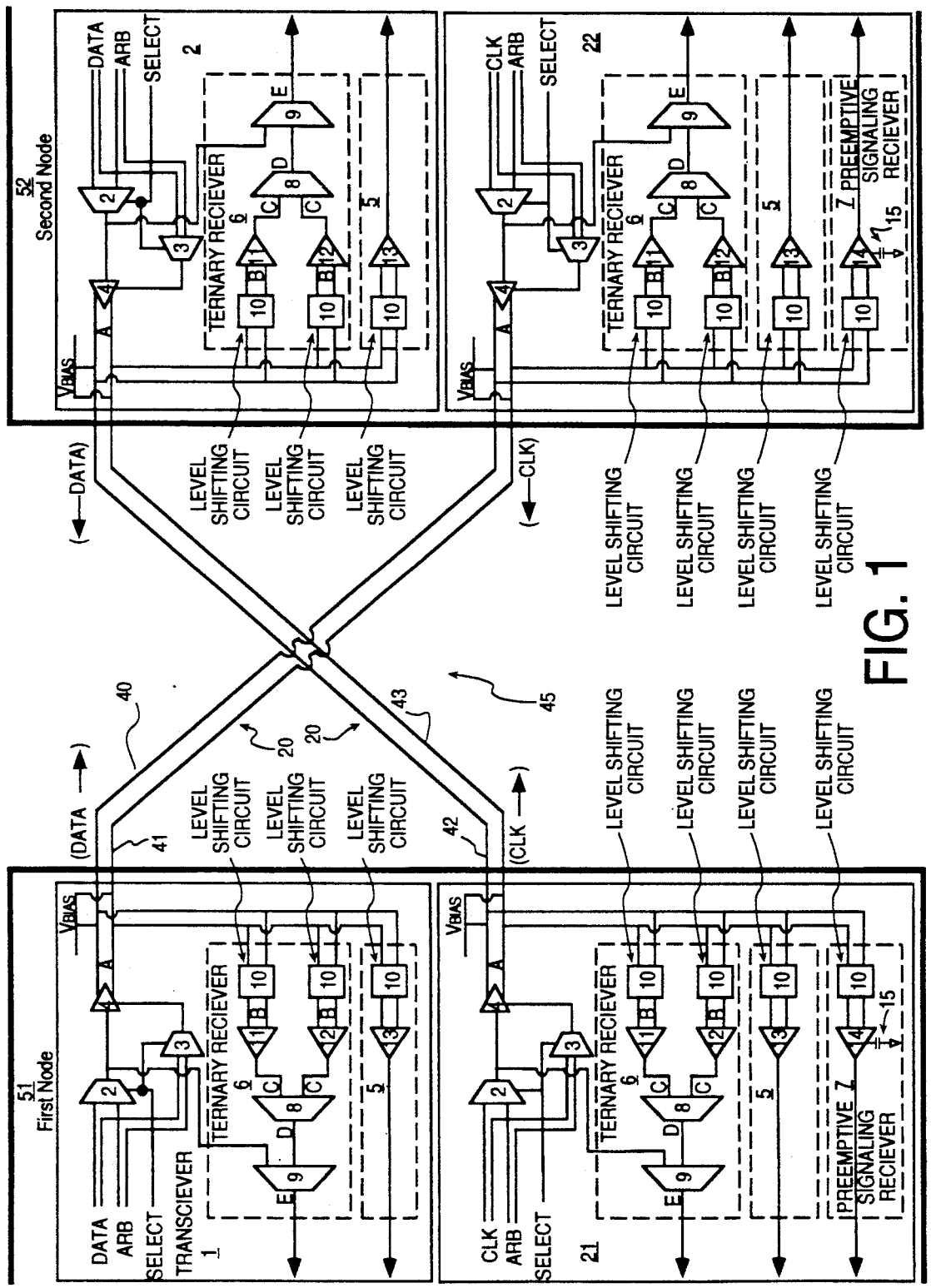
FIG. 1 is a block diagram showing two pairs of bus transceivers utilized for a differential serial bus implementation of the present invention wherein one pair of data/arbitration signaling transceivers comprise a binary receiver and a ternary receiver and another pair of clock signaling transceivers comprise a binary receiver, a ternary receiver and a preemptive signaling receiver.

In a first embodiment of the present invention as shown in FIG. 1, two pairs of bus transceivers 1,22 and 2,21 are interconnected via a twisted pair, serial bus 45 for the half duplex transmission of data signals and the full duplex transmission of control signals between nodes 51,52. The twisted pair, serial bus 45 comprises two pairs of signal wires 40,41 and 42,43 with each pair forming a transmission channel 20 for the transmission of differential signals. During a data transfer phase on the bus 45 where data is transmitted from the first node 51 to the second node 52, the first pair of signal wires 40,41 is used to transfer differential data signals while the second pair of signal wires 42,43 is used to transfer differential clock signals between the two nodes 51,52. Similarly, during a data transfer phase on the bus 45 where data is transmitted from the second node 52 to the first node 51, the first pair of signal wires 40,41 is used to transfer differential clock signals while the second pair of signal wires 42,43 is used to transfer differential data signals between the two nodes 51,52. In an arbitration phase, however, the bus 45 is used in a full duplex mode (as a two bit parallel channel, for example) where both the first and second nodes 51,52 transmit arbitration information simultaneously on both pairs of signal wires 40,41 and 42,43.

Although the first embodiment is directed toward an application of the bus transceiver with a serial bus 45 having twisted pair signal wires 40,41 and 42,43, it would be obvious to one skilled in the art to utilize the bus transceivers and the dominant logic scheme of the present invention in any type of bus which performs baseband data transfers despite the number of transmission channels in the bus, the type of communication channel (i.e., single ended or differential) or the specific number of signaling levels used. Similarly, although the first embodiment depicts the bus 45 as being simply coupled between two nodes 51,52, in another embodiment to be described below (see FIG. 3), a plurality of nodes 3 in a computer system are arbitrarily coupled together via a plurality of the twisted pair busses 45 comprising links 40 to form, in general, an interconnected, multi-speed bus 80.

With reference to the first and second transceivers 1,2 shown in FIG. 1, each comprises a differential driver 4 for driving differential signal states on the bus 45, a high speed binary receiver 5 for receiving high speed data signals and a ternary receiver 6 for receiving control signals. With reference to the transceivers 21 and 22, each similarly comprises a differential driver 4, a high speed binary receiver 5 and a ternary receiver 6. However, transceivers 21 and 22 additionally comprise a preemptive signaling receiver 7 to detect preemptive control messages superimposed on the clock signal wires by the respective receiving node during a data transfer phase for terminating the transfer of data upon receipt of such a message.

Both the driver 4 of transceiver 1 and the driver 4 of transceiver 2 can drive data signals or control signals depending upon the state of the input multiplexors 2 which supply the signals as input to the drivers 4. Separate enable multiplexors 3 supply the correct enable control signals depending upon the transceiver state (data or control signal transfer). In a preferred implementation of the driving circuit, both the data and control lines are two bits wide. The first bit enters the driver input multiplexor 2 and controls the signal states of the driver 4. The second bit enters the driver enable multiplexor 3 and controls the on/off states of the driver 4. During the data signal transfer phase, only one driver 4 of both transceivers 1,2 is on; the enabled driver remains on while the disabled driver remains off until the termination of the data signal transfer phase. (An exception to this is the transmission of a preemptive control message (during the preemption of a data transfer phase) by the driver 4 of the transceiver receiving the clock signals during the particular data transfer phase as will be more fully explained below.) During the control signal transfer phase, each driver 4 is enabled or disabled as necessary. A disabled driver generates the Z signal state, while an enabled driver generates the binary signal states directed by the first input bit.

To enable the full duplex transmission of control signals, including arbitration signals, between the first and second nodes 51,52, the present invention provides a bus 45 having at least three signal states A, wherein in a preferred implementation, the third signal state is the intermediate Z signal state having a current amplitude of approximately 0 mA. The Z signal state is utilized not only to reduce the power consumption of the bus 45 during a bus idle state (by virtue of its almost null current amplitude), but also to increase the amount of information that can be transferred on the bus 45. This latter function is made possible through the use of the ternary receiver 6 in each transceiver 1,2,21,22 which operates pursuant to a dominant logic scheme. In implementing the dominant logic scheme, the three signal states A (0,1,Z) are combined on the bus 45 through the simultaneous driving of selected signal states A by each of the transceiver pairs 1,22 and 2,21 so as to form one of three bus states B (0,1,Z) representing the resultant current amplitude on the bus 45. The bus state B formed on the bus 45 by a simultaneous driving situation is then detected and utilized by the ternary receivers 6 to create one of three corresponding logic states D (0,1,Z) which is subsequently decoded by the ternary receiver 6 of one transceiver to determine the signal state A being driven by the other transceiver so as to reconstruct the control message transmitted by thereby.

Although the dominant logic scheme is preferably implemented through the use of three signal states A, the present invention can clearly be extended to transmission channels which can accommodate more than three signal states A, and hence, more than three bus states B which can be used to form more than three logic states D. Similarly, the invention can also be implemented using a third signal state different from the intermediate Z signal state. This can be done as long as at least three signals states A are utilized to form three bus states B such that: (a1) The current amplitude resulting on the bus 45 from the simultaneous transmission of a 0 signal state by one driver 4 and a 1 signal state by the corresponding driver 4 is equivalent to the simultaneous transmission on the bus 45 of the Z signal state by both drivers 4 (i.e., a Z bus state); (a2) The current amplitude resulting on the bus 45 from the simultaneous transmission of a 0 signal state by one driver 4 and a Z signal state by the corresponding driver 4 is equivalent to the transmission of the 0 signal state by any one of the two drivers 4 (i.e., a 0 bus state); (a3) The current amplitude resulting on the bus 45 from the simultaneous transmission of a 1 signal state by one driver 4 and a Z signal stage by the corresponding driver 4 is equivalent to the transmission of the 1 signal state by any one of the two drivers 4 (i.e., a 1 bus state); (a4) The current amplitude resulting on the bus 45 from the simultaneous transmission of a 0 signal state by both drivers 4 is equivalent to the transmission of the 0 signal state by any one of the two drivers 4 (i.e., a 0 bus state); (a5) The current amplitude resulting on the bus 45 from the simultaneous transmission of a 1 signal state by both drivers 4 is equivalent to the transmission on the bus of the 1 signal state by any one of the two drivers (i.e., a 1 bus state); and (a6) The current amplitude resulting on the bus 45 from the simultaneous transmission of a Z signal state by both drivers 4 is equivalent to the transmission of the Z signal state by any one of the two drivers 4 (i.e., a Z bus state). This combination of signal states A used to create the bus states B is summarized in Table 1 below:

TABLE 1

| First signal state A | Second signal state A | Bus state B |
|---|---|---|
| 1 | 1 | 1 |
| 1 | 0 | Z |
| 1 | Z | 1 |
| 0 | 1 | Z |
| 0 | 0 | 0 |
| 0 | Z | 0 |
| Z | 1 | 1 |
| Z | 0 | 0 |
| Z | Z | Z |

In the preferred implementation, the transmission of the Z signal state on the bus 45 is performed by disabling the corresponding driver 4 of the data transmitting receiver, thereby reducing the overall power consumption while automatically fulfilling the above conditions a2, a3, a4, a5 and a6. Condition a1 can then be fulfilled by choosing the current amplitudes of the binary signal states 0 and 1 such that the resulting current amplitude (or bus state B) during a simultaneous driving of the 0 and 1 signal states is almost null so as to form the Z bus state.

In order to detect the bus states B formed on the bus 45, the ternary receivers 6 each comprise two voltage comparators 11,12 having built in voltage thresholds or operational amplifiers. Furthermore, the ternary receivers 6 further comprise logic circuitry for translating the bus states B into corresponding logic states D and E which are subsequently decoded by the ternary receivers 6 for use in the transfer of control messages during the arbitration phase on the bus 45.

In terms of a specific implementation of the three signal states A on a differential serial bus 45 in which each pair of signal wires 40,41 and 42,43 has a positive wire 40,42 and a negative wire 41,43, respectively, a binary 0 signal state is transmitted on the transmission channel 20 by driving −4 mA on the positive wire and +4 mA on the negative wire; a binary 1 signal state is transmitted on the transmission channel 20 by driving +4 mA on the positive wire and −4 mA on the negative wire; and the Z signal state is transmitted on the transmission channel 20 when approximately 0 mA exists on each of the signal wires.

With respect to the bus states B produced on the transmission channel 20 by the simultaneous driving of signal states A, there are in essence five possible bus states: A 00 bus state corresponding to a current amplitude of approximately −8 mA on the positive wire and approximately +8 mA on the negative wire; a 0 bus state corresponding to approximately −4 mA on the positive wire and approximately +4 mA on the negative wire; a Z bus state corresponding to approximately 0 mA on both wires; a 1 bus state corresponding to approximately +4 mA on the positive wire and approximately −4 on the negative wire; and a 11 bus state corresponding to approximately +8 mA on the positive wire and approximately −8 mA on the negative wire.

Furthermore, in the preferred implementation, the transmission channels 20 have a characteristic impedance of 110Ω and are double terminated. Therefore a 0 bus state is represented by a differential voltage of approximately −220 mV. Similarly, a 1 bus state is represented by a differential voltage of approximately +220 mV. Accordingly, a Z bus state is represented by a differential voltage of approximately 0 mV.

Although it is possible to produce five bus states B on the transmission channel 20, the preferred embodiment of the present invention is designed to take advantage of only three out of the five possible bus states B (i.e., 0, 1 and Z) in order to minimize the complexity of the transceiver circuitry. However, it would be obvious to one skilled in the art that all five bus states B can be utilized to extract more information for use in a higher level bus protocol. The use of all possible bus states B would require the addition of a multi-level encoding mechanism (already in use) in addition to the implementation of two more voltage comparators 11,12 (or operational amplifiers) in the ternary receivers 6.

As mentioned above, the ternary receiver preferably comprises two voltage comparators for detecting the bus states B formed on the bus 45. The threshold of the first comparator 11 therefore has a value between the detected voltage amplitudes of the Z bus state and the 1 bus state (i.e., −98 mV), while the threshold of the second comparator 12 has a value between the detected voltage amplitudes of the Z bus state and the 0 bus state (i.e., +98 mV).

Furthermore, with respect to the utilization of the ternary receiver 6 to implement the three signal states A in the present invention, it was necessary to realize a fundamental distinction between the data transfer mode of operation and the arbitration mode of operation on the transmission channel 20. The binary data transfer mode is in general a half duplex transmission where its speed is limited only by the capability of the transceiver circuits and the bandwidth of the transmission channel 20. The transceiver of the data transmitting node outputs on the transmission channel 20 the desired message at the maximum possible speed independent of the signal propagation delay along the transmission channel 20. The arbitration transfer mode, however, is in general a full duplex transmission where the maximum possible speed is largely limited by the propagation delay along the transmission channel 20. This is because it is necessary to provide all nodes 3 coupled to the interconnected bus 80 with a chance to see and respond to the arbitration messages. Therefore, the full duplex transmission provided by the ternary receivers 6 is necessary only during the arbitration transfer mode. The fundamental limits that the bus' physical configuration imposes upon the arbitration process enables the use of lower bandwidth ternary receivers 6 without significantly impacting the overall performance of the system. The lower bandwidth ternary receivers 6 will compensate for the reduction in signal amplitude, thus maintaining the same bit error rate levels.

With respect to the binary data transfer mode, the binary receivers 5 comprise high speed receivers having a single voltage comparator 13 for reception of data signals transmitted via the transmission channel 20. The voltage comparators 13 translate the bus states 0 and 1 into the signal states 0 and 1 during the data transfer mode. The higher level protocol controlling the operation of the entire bus 80 shown in FIG. 3 guarantees that during the data transfer mode on the bus 45, the only bus states B used are 0 and 1. Hence, the binary receivers 5 of the present invention do not require hysteresis, thereby minimizing the duty-cycle distortion of the received data. During the bus arbitration phase, however, the receivers 5 are disabled since the control signals are received only by the ternary receivers 6.

Since the high speed, binary data transfer mode is only half-duplex, an arbitration scheme is required to determine the preferred direction of the binary data transfer. In the most general case, the negotiation to determine the preferred direction of the upcoming data transfer can involve all the nodes 3 connected to the bus 80. Because the exchange of control signals which implement the bus arbitration algorithm is made full duplex, the duration of the arbitration phase is reduced, thus maximizing the bus useful bandwidth. The dominant logic scheme implemented in the ternary receivers 6 enables the transceivers connected to the links 40 to simultaneously transmit and receive control information, thus reducing the minimum duration of the arbitration phase.

In the implementation of the dominant logic scheme in the ternary transfer mode, the ternary receiver 6 of a "data receiving" transceiver 21 utilizes two voltage comparators 11,12 each able to output a binary value C responsive to the detected bus state B. With reference to FIG. 1 and Table 2 below, through the use of combinational logic, such as a first multiplexor 8, the two binary values C derived from the first and second comparators 11,12 are translated into a logic state D representing the bus state B on the transmission channel 20. This logic state D is then supplied as input to a second multiplexor 9 along with the signal state A being driven locally by the driver 4 of the data receiving transceiver 21 to output a partially decoded logic state E representing to a certain extent the signal state A transmitted by the driver 4 of the "data transmitting" transceiver 2. (It is noted that although each transceiver is driving a signal state A on the transmission channel 20 so as to produce a simultaneous driving situation, we refer to a specific transceiver as a "data receiving" transceiver (either 21 or 22) when we are analyzing its decoded output to determine what signal state A the corresponding "data transmitting" transceiver (either 2 or 1, respectively) is driving on the transmission channel 20.)

As noted above, although the logic state E output by the data receiving transceiver 21 is only partially decoded, the logic state E can be fully decoded if all five bus values B were utilized along with the implementation of two more voltage comparators in the ternary receivers 6. In the preferred embodiment, however, it was decided to select a minimum complexity implementation for practical purposes and to work around the four situations in which the logic states E output by the ternary receivers 6 could not be fully decoded. This is done by adopting an arbitration scheme for the interconnected bus 80 of the present invention in which a differentiation between the possible signal states A represented by a particular logic state E is unnecessary. That is, in terms of the arbitration message exchange on the interconnected bus 80, the logic states E are utilized in the arbitration scheme in such a manner so as to be indistinguishable to the data receiving transceiver 21.

With respect to the specific implementation of the ternary receiver in each of the transceivers, the first comparator 11 of the ternary receivers 6 has a threshold of M (i.e., approximately +98 mV) such that it is able to determine from an input voltage I of a detected bus state B either that $I \geq M$ or that $I < M$, where the comparator 11 outputs as a binary value a 1 or a 0, respectively (see Table 2 below). The second comparator 12 having a lower threshold of N (i.e., approximately −98 mV) is able to determine either that $I \geq N$ or that $I < N$, where the second comparator 12 outputs as a binary value a 1 or a 0, respectively. In this manner, the bus states B existing on the bus 45 during the simultaneous driving situations can be detected and encoded into logic states D using the assumption that $M > N$ so as to represent the bus states B in the dominant logic scheme. With reference to Table 2 shown below, the binary values are combined such that when $I \geq M > N$, the first multiplexor 8 outputs a logic state of 1; when $I < N < M$, the first multiplexor 8 outputs a logic state of 0; and when $I < M$ and $I \geq N$, the first multiplexor 8 outputs a logic state of Z.

TABLE 2

| First Comparator | Second Comparator | Binary Value | | encoded logic state D output from multiplexor 8 |
|---|---|---|---|---|
| | | First Comparator | Second Comparator | |
| $I \geq M$ | $I \geq N$ | 1 | 1 | 1 |
| $I < M$ | $I \geq N$ | 0 | 1 | Z |
| $I < M$ | $I < N$ | 0 | 0 | 0 |

With reference to the comprehensive Table 3 shown below, the output of the data receiving transceiver's ternary receiver 6 consists of partially decoded logic states E which denote to a certain extent the signal state A transmitted by the driver 4 of the data transmitting transceiver 2. The partially decoded logic states E are derived through the use of a second multiplexor 9 which receives as input the logic states D output from the first multiplexor 8 in addition to the signal states A. The values of the logic states D and the signal states A are combined in the second multiplexor 9 as shown in Table 3 to obtain the logic states E:

TABLE 3

| Local signal state A driven by node 51 | Signal state A driven by node 52 | Bus state B | Comparator value for comparator 11 | Comparator value for comparator 12 | Local encoded logic state D | Local partially decoded logic state E |
|---|---|---|---|---|---|---|
| 0 | 0 | 0 | 0 | 0 | 0 | 0 |
| 1 | 0 | Z | 0 | 1 | Z | 0 |
| Z | 0 | 0 | 0 | 0 | 0 | 0 |
| 0 | 1 | Z | 0 | 1 | Z | 1 |
| 1 | 1 | 1 | 1 | 1 | 1 | 1 |
| Z | 1 | 1 | 1 | 1 | 1 | 1 |
| 0 | Z | 0 | 0 | 0 | 0 | 0 |
| 1 | Z | 1 | 1 | 1 | 1 | 1 |
| Z | Z | Z | 0 | 1 | Z | Z |

As an example, if the driver 4 of the transceiver 21 outputs a Z signal state and the driver 4 of the data transmitting transceiver 2 outputs a 0 signal state, the ternary receiver 6 of the data receiving transceiver 21 will detect the presence of a 0 bus state (the resulting current being approximately −4 mA on the positive signal wire 42 and +4 mA on the negative signal wire 43, which on a doubly terminated 110Ω characteristic impedance transmission line translates into approximately −220 mV of differential voltage, respectively). This is encoded as described above into a 0 logic state by the first multiplexor 8 and supplied to the second multiplexor 9 which also receives as input the signal state A locally driven onto the transmission channel 20 by the driver 4 of the data receiving transceiver 21. Knowing that the data receiving transceiver 21 is driving a Z signal state on the transmission channel 20 at that time, the second multiplexor 9 determines (for example, by implementing columns 1 and 6 of the above Table 3 in the multiplexor's circuitry) that the 0 logic state is caused by transceiver 2 driving a signal state of 0 on the transmission channel 20 at the same time. Hence, the output from the ternary receiver 6 is a 0 decoded logic state.

In addition to being able to transmit and decode control signals in a full-duplex transmission environment, the present invention also provides a means for interrupting the half-duplex transmission of data signals between the first and second nodes 51,52 so that higher priority control signal transfers can take place. For example, if the second node 52 is in the process of a data signal transfer to the first node 51, it is desirable that the first node 51 be capable of signaling to the second node 52 that it has a higher priority control signal transfer to conduct. In such a situation, the transmitting node 52 would then terminate its data signal transfer in order to permit the first node 51 to begin its higher priority control signal transfer.

In one embodiment of the present invention, this is performed by providing a preemptive signaling receiver 7 comprising either a voltage comparator or an operational amplifier in the clock transmitting transceiver of each node, i.e. in transceiver 21 of node 51 and transceiver 22 of node 52. The preemptive signaling receiver 7 of the transceiver 21 of the first node 51 is connected to the twisted pair signal lines 42,43 used for the transfer of the reference clock signal from the first node 51 to the second node 52. Similarly, the preemptive signaling receiver 7 of the transceiver 22 of the second node 52 is connected to the twisted pair signal lines 40,41 used for the transfer of the reference clock signal from the second node 52 to the first node 51.

When the first node 51 must transmit priority control information to the second node 52 during a data transfer from the second node 52 to the first node 51, the first node 51 enables the driver 4 of the clock receiving transceiver 1 so that a signal state of 1 (a preemptive message) is driven on the signal lines 40,41. In this manner, the dc level of the reference clock signal on the signal lines 40,41 is shifted up from alternating bus states of 0 and 1 to alternating bus states of Z and 11 which triggers the built in voltage threshold of the comparator 14 of the preemptive signaling receiver 7 of the clock transmitting transceiver 22. The preemptive receiver 7 of the clock transmitting transceiver 22 then outputs a corresponding preemptive signal to the driving circuitry of the second node 52 to stop the transfer of data to the first node 51.

In terms of currents, the current levels for a differential clock signal representing alternating signal states of 0 and 1 on the signal lines 40,41 comprise alternating values of −4 mA and +4 mA on the positive signal wire 40 and alternating values of +4 mA and −4 mA on the negative signal wire 41, respectively. When the clock receiving transceiver 1 drives a signal state of 1 comprising current amplitudes of +4 mA and −4 mA on the positive wire 40 and the negative wire 41, respectively, the resulting current amplitudes on the wires 40, 41 comprise alternating values of 0 mA and +8 mA on the positive wire 40 and alternating values of 0 and −8 mA on the negative wire 41, respectively.

To detect the resultant alternating bus states of Z and 11 produced by the preemptive signaling, the threshold of the comparator 14 of each preemptive signaling receiver 7 is preferably set at approximately +100 mV. Furthermore, each preemptive signaling receiver 7 also comprises a filtering circuit 15 which extracts the DC component of the differential clock signal driven on the clock lines 40,41 as is well-known in the art. The time constant of this filter 15 should be long enough to reduce the amplitude of the AC signal component below the range of the preemptive signaling receiver's threshold level, but small enough to provide an adequately short reaction time to the preemptive signal.

So as to permit the voltage comparators 11,12,13,14 forming the receivers 5,6,7 of the present invention to receive the transmitted signals at the amplitude required to detect the proper bus voltage values, the present invention further provides a means for common mode shifting of the signals at the front end of the receivers 5,6,7 while providing for a voltage offset independent of the fabrication process. The voltage drop that can occur across the ground connection between the two nodes 51,52 connected via bus 45 may cause the common mode value of the received signal amplitude to fall below the common mode range of the receivers 5,6,7. Therefore, in order to obtain the proper signal amplitudes required by the comparators 11,12,13,14 and to optimize the common mode performance of the bus 45, a common mode level shift of approximately 650 mV is implemented at the front end of each receiver 5,6,7. This is performed by providing each receiver 5,6,7 of the transceivers 1,2,21,22 with the level shifting circuit 10 shown in FIG. 2 wherein the PNP bipolar junction transistors Q1 and Q2 implement a common mode voltage translator in front of the voltage comparators 11,12, 13,14.

Specifically, two current sources I1 and I2 are disposed in parallel downstream from a common voltage bias and are respectively coupled to the emitter of each PNP transistor Q1 and Q2 similarly arranged in parallel. The base of each PNP transistor Q1 and Q2 is coupled to a separate signal wire, while the collectors of the PNP transistor Q1 and Q2 are mutually tied to ground. The emitter of each PNP transistor Q1 and Q2 is further coupled to a separate input of the voltage comparators 11,12,13,14.

With this arrangement, the PNP bipolar junction transistors Q1 and Q2 provide a DC level shift of approximately 650 mV over their base to emitter junctions while the current sources I1 and I2 provide the biasing mechanism for the PNP transistors Q1 and Q2 so that the ratio between the current amplitudes of the current sources I1 and I2 controls the thresholds of the comparators 11,12,13,14. However, the current absolute magnitudes of the current sources I1 and I2 should be to a certain extent independent of process and temperature variations in order to obtain a predictable common mode level shift. For the high speed, binary receivers 5, which in this specific embodiment have a zero threshold, the two currents should be equal in amplitude (i.e., a value of approximately $I1=I2=30$ μA, with the bipolar transistors Q1 and Q2 being identical). In this manner, the binary receiver 5 will output a binary 1 when $Va \geq Vb$ and will output a binary 0 when $Vb < Va$. For the comparators 11,12 of the ternary receivers 6, the desired threshold is implemented by precisely controlling the ratio between the current sources I1 and I2 for each comparator 11,12. The current values for the first comparator 11 are $I1=15$ μa and $I2=105$ μa when Q2 is four times the size of Q1 so that it will output a binary 1 when $Va \geq Vb+98$ mV and a binary 0 when $Va < Vb+98$ mV. Similarly, the current values for the second comparator 12 are $I1=105$ μa and $I2=15$ μa when Q1 is four times the size of Q2 such that it will output a binary 1 when $Va \geq Vb-98$ mV and a binary 0 when $Va < Vb-98$ mV.

In general, the control over the ratio of two current sources I1 and I2 is very good in the integrated circuits manufacturing process. Specifically, in a standard CMOS manufacturing process, the front end PNP bipolar junction transistors Q1 and Q2 can be implemented as vertical substrate transistors without any process modifications. The offset thus implemented will have a small variation with temperature due to the variation of the base-emitter junction voltages of the two PNP transistors with temperature. This variation can be easily canceled by implementing an opposite temperature dependency for the two bias current sources I1 and I2.

Figure 2:
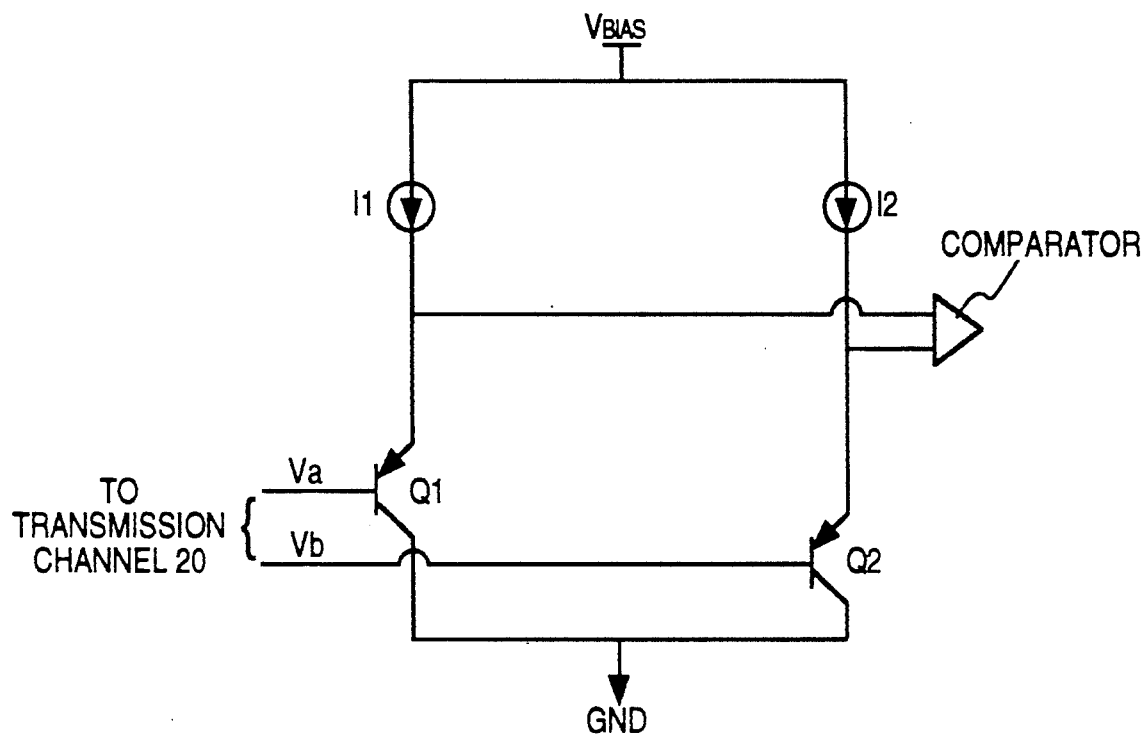
FIG. 2 is a diagram of the PNP level-shifting circuit used at the front end of each of the receivers of the bus transceivers of the present invention.

In addition, the level shifting circuit 10 shown in FIG. 2 also permits the implementation of a single ternary receiver 6 in place of each of the binary, ternary and preemptive signaling receivers 5,6,7 for each transceiver 21,22 although this will increase the theoretical bit error rate during the arbitration transfer mode due to the high bandwidth of the ternary receiver. That is, the present invention can be modified so that both transfer modes in addition to the preemptive signaling method can be performed using a single ternary receiver 6. During the ternary arbitration transfer mode, the ternary receiver 6 operates as discussed above. Specifically, the threshold of the first comparator 11 is set to a first value corresponding to a current amplitude half way between the 1 signal state and the Z signal state, and the threshold of the second comparator 12 is set to a second value corresponding to a current amplitude half way between the 0 signal state and the Z signal state for detecting the bus states B in a simultaneous driving situation.

However, in the binary data transfer mode, the ratio between the current sources I1 and I2 for the PNP level shifting circuit 10 placed in front of the second comparator 12 can be dynamically switched (or controlled) in order to utilize the second comparator 12 of the ternary receiver 6 as the binary receiver 5. In this manner, the threshold of the second comparator 12 is set to a third value corresponding to a current amplitude half way between the binary signal states transmitted on the bus (i.e., 0 volts) for use as the binary receiver 5. With respect to the first comparator 11, its threshold is maintained at the first value during the binary data transfer mode so as to utilize the second comparator 12 as the preemptive signaling receiver 7. However, if preemptive signaling is not required, then the first comparator 11 may simply be disabled. In this way, the overall size and complexity of the transceiver circuits can be greatly reduced through the use of a single ternary receiver 6. The increase in the theoretical bit error rate problem can be solved by reducing the bandwidth of the second voltage comparator 12 when it is used as part of the ternary receiver in the arbitration phase and then, restoring its bandwidth to its full value when it is used as a binary receiver in the data transfer phase. The bandwidth of the first voltage comparator 11 can be maintained low as it is used exclusively for receiving the control signals during the arbitration phase and the preemptive signal during the data transfer phase.

According to a further embodiment of the present invention, a method and apparatus is provided for the full duplex transmission of arbitration signals in a particular multi-speed bus architecture scheme designed pursuant to the *IEEE Standards Document* P1394 entitled "High Performance Serial Bus" (draft 5.3v1 of Oct. 14, 1992). This document is appended hereto as Appendix A for reference. The standard described in P1394 is designed to provide a high speed, serial bus having a low cost interconnection between nodes within the computer system.

Figure 3:
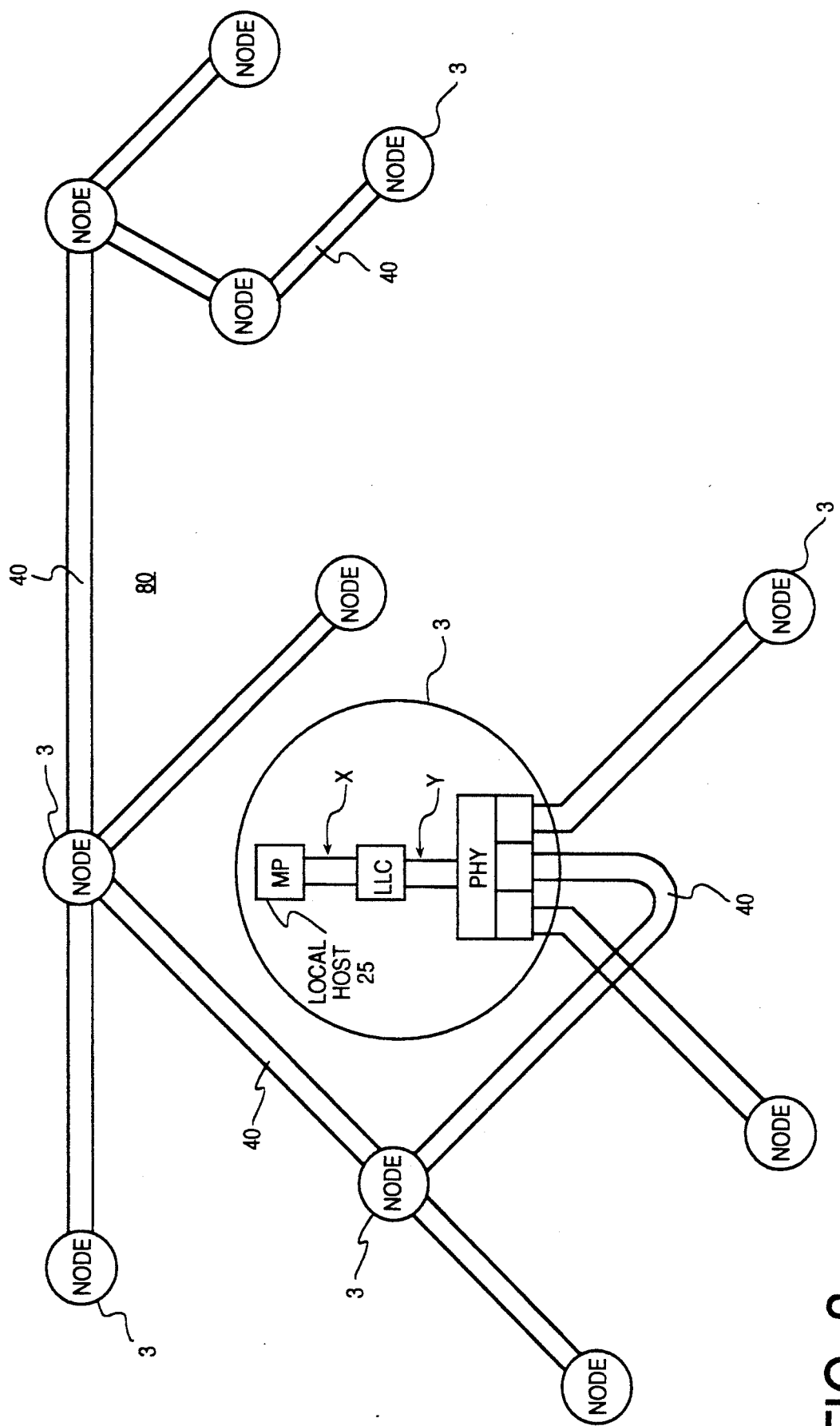
FIG. 3 is a block diagram showing a plurality of nodes interconnected in an arbitrary bus topology pursuant to the P1394 bus architecture standard, including the presentation of a scalable interface (denoted as the bus Y) between the PHY and LLC chips of a particular node, wherein the bus transceivers of the present invention are incorporated in the PHY's of adjacent nodes.

As shown in FIG. 3, a plurality of nodes 3 of a computer system are arbitrarily coupled together via a plurality of links 40 to form an interconnected, multi-speed bus 80. In this embodiment, each link 40 comprises a differential twisted pair, serial bus 45 as described. Additionally, each node 3 coupled to the interconnected, multi-speed serial bus comprises a physical channel interface chip (or "PHY") directly connected to the serial bus for the reception and transmission of control and data signals. Each node 3 also comprises a link layer chip (or "LLC") which transmits to and receives from the PHY both data and control signals via a fixed speed, variable size bus Y forming a scalable interface. The LLC also interfaces with the local host 25 (i.e., a microprocessor MP) of the node via a fixed speed, fixed size bus X in order to process the data received from the PHY.

With such an arrangement, the interconnected pairs of bus transceivers 1,22 and 2,21 (shown in FIG. 1) of the present invention are respectively utilized in adjacent nodes 3 of the system. In this manner, the transmission of data signals between PHY's of adjacent nodes 3 is performed using the binary transfer mode and the transmission of control signals is performed using the ternary transfer mode as described above. Furthermore, in the specific P1394 implementation, the PHY circuits are supplied with power via the links 40 which contain, in addition to the communication channels 20, a voltage distribution line and a ground connection line. Although this power distribution architecture may cause a significant voltage difference in the ground potential between two adjacent nodes 3, the use of the level shifting circuits 10 of the present invention advantageously solves this problem.

While the present invention has been described in conjunction with the above-embodiments, it is evident that numerous alternatives, depictions, variations and uses will be apparent to those skilled in the art in light of the foregoing description. As previously noted, it would be obvious to one skilled in the art to utilize the bus transceivers including the dominant logic scheme of the present invention in any type of bus which performs baseband data signal transfers despite the number of transmission channels in the bus, the type of communication channel (i.e., single ended or differential) or the specific number of signaling levels used.

We claim:

1. In a bus architecture having at least a first communications node and a second communications node coupled together via a bus having at least one transmission channel, each node having at least a first transceiver for enabling full duplex transmission of control signals and half duplex transmission of data signals between the nodes, the first transceiver of the first node comprising:

a driver coupled to the bus for driving current amplitudes on the bus corresponding to signal states, the signal states comprising at least a first signal state, a second signal state and a third signal state;

a data binary receiver coupled to the bus for receiving data signals driven on the bus by the first transceiver of the second node during a data transfer phase, the states of the data signals comprising the first and second signal states;

a ternary receiver coupled to the bus for receiving control signals driven on the bus by the first transceiver of the second node, the states of the control signals comprising the first, second and third signal states, the ternary receiver having first and second binary receivers for detecting resultant current amplitudes forming bus states created on the bus during simultaneous driving of control signals by the nodes during a control transfer phase and a logic circuit utilizing the bus states on the bus and the signal states driven by the first transceiver of the first node to output reconstructed control signals representing the control signals driven on the bus by the first transceiver of the second node; and first, second and third common mode level shifting circuits coupled between the bus and each of the data binary receiver and the first and second binary receivers of the ternary receiver, respectively, said shifting circuits receiving the signal states and bus states transmitted on the bus and outputting to the data binary receiver and the first and second binary receivers of the ternary receiver corresponding signal states and bus states having current amplitudes increased to within a common mode range of each the data binary receiver and the first and second binary receivers of the ternary receiver.

2. The transceiver of claim 1, wherein the first and second signal states have current amplitudes of opposite polarity and a combination of the current amplitudes of the first and second signal states produces the current amplitude of the third signal state.

3. The transceiver of claim 2, wherein the first and second signal states have equal current amplitudes opposite in sign and the third signal state has a zero current amplitude for use as a bus idle state.

4. The transceiver of claim 1, wherein the logic circuit of the ternary receiver comprises at least a first multiplexor and a second multiplexor, the first multiplexor receiving as input binary values output by the binary receivers of the ternary receiver and outputting logic states representing the bus states formed on the bus, the second multiplexor receiving the logic states output by the first multiplexor in addition to the signal states driven on the bus by the first transceiver of the first node and outputting partially decoded logic states representing the control signals driven by the first transceiver of the second node.

5. The transceiver of claim 4, wherein the first and second binary receivers of the ternary receiver comprise a first voltage comparator having a first voltage threshold and a second voltage comparator having a second voltage threshold, respectively, the first voltage comparator outputting a first binary value when the resultant current amplitude is greater than or equal to the first voltage threshold and a second binary value when the resultant current amplitude is less than the first voltage threshold, the second voltage comparator outputting the first binary value when the resultant current amplitude is greater than or equal to the second voltage threshold and the second binary value when the resultant current amplitude is less than the second voltage threshold.

6. The transceiver of claim 5, wherein the first multiplexor of the ternary receiver outputs a first logic state when two first binary values are input to the first multiplexor, a second logic state when two second binary values are input to the first multiplexor and a third logic state when the first binary value and the second binary value are input to the first multiplexor.

7. The transceiver of claim 6, wherein the second multiplexor of the ternary receiver outputs the second signal state in response to an input of the second logic state and the second signal state, outputs the second signal state in response to an input of the third logic state and the first signal state, outputs the second signal state in response to an input of the second logic state and the third signal state, outputs the first signal state in response to an input of the third logic state and the second signal state, outputs the first signal state in response to an input of the first logic state and the first signal state, outputs the first signal state in response to an input of the first logic state and the third signal state, outputs the second signal state in response to an input of the second logic state and the third signal state, outputs the first signal state in response to an input of the first logic state and the third signal state and outputs the third signal state in response to an input of the third logic state and the third signal state.

8. The transceiver of claim 1, wherein the data binary receiver and the first and second binary receivers of the ternary receiver each comprise a voltage comparator having a voltage threshold, the first, second and third common mode level shifting circuits each comprise a common mode voltage translator having first and second current sources for varying the thresholds of the data binary receiver and the first and second binary receivers of the ternary receiver.

9. The transceiver of claim 8, wherein the bus comprises a differential serial bus having at least one pair of first and second twisted signal wires and the common mode voltage translator of each common mode level shifting circuit further comprises first and second PNP transistors disposed in parallel having emitters coupled to a common voltage bias and collectors coupled to a common ground, the first PNP transistor having a base coupled to the first signal wire and the second PNP transistor having a base coupled to the second signal wire, the first and second current sources coupled between the common voltage bias and the emitters of the first and second PNP transistors, respectively, with first and second outputs of the first and second current sources for each of the first, second and third common mode level shifting circuits coupled to first and second inputs of the data binary receiver and the first and second binary receivers of the ternary receiver, respectively.

10. The transceiver of claim 9, wherein the ratio of the outputs of the first and second current sources of each the first and second common mode level shifting circuits is controlled to be proportional to a detected temperature for compensating variations in base-emitter junction voltages of the first and second PNP transistors caused by variations in the detected temperature.

11. In a bus architecture having at least a first communications node and a second communications node coupled together via a bus having at least one transmission channel for the transmission of signals between the nodes, each node having at least a first transceiver for enabling full duplex transmission of control signals during control transfer phases and half duplex transmission of data signals during data transfer phases, the first transceiver of the first node comprising:

a driver coupled to the bus for driving current amplitudes on the bus corresponding to signal states, the signal states comprising first, second and third signal states;

first and second binary receivers having first and second voltage thresholds, respectively, coupled to the bus for receiving resultant current amplitudes forming bus states created on the bus during simultaneous driving of control signals by the nodes during control transfer phases and receiving the current amplitudes of the signal states driven on the bus during data transfer phases, the states of the control signals comprising the first, second and third signal states and the states of the data signals comprising the first and second signal states;

first and second common mode level shifting circuits coupled between the bus and each of the first and second binary receivers, respectively, said shifting circuits receiving the signal states and bus states transmitted on the bus and outputting to the first and second binary receivers corresponding signal states and bus states having current amplitudes increased to within a common mode range of each of a first and second voltage comparators; and a logic circuit coupled to the bus and utilizing the bus states on the bus and the signal states driven by the first transceiver of the first node during control transfer phases to output reconstructed control signals representing the control signals driven on the bus by the first transceiver of the second node.

12. The transceiver of claim 11, wherein the first and second signal states have current amplitudes of opposite polarity and a combination of the current amplitudes of the first and second signal states produces the current amplitude of the third signal state.

13. The transceiver of claim 12, wherein the first and second signal states have equal current amplitudes opposite in sign and the third signal state has a zero current amplitude for use as a bus idle state.

14. The transceiver of claim 11, wherein the first and second common mode level shifting circuits each comprise a common mode voltage translator having first and second current sources for varying the thresholds of the first and second binary receivers, the first and second current sources of each common mode level shifting circuit having outputs such that a ratio of the outputs of the first common mode level shifting circuit is controlled to set the first voltage threshold of the first binary receiver during control transfer phases to a first value and a ratio of the outputs of the second common mode level shifting circuit is controlled to set the second voltage threshold of the second binary receiver during control transfer phases to a second value for detecting the resultant current amplitudes formed on the bus during control transfer phases, the ratio of the outputs of the current sources of the second common mode level shifting circuit being controlled to set the second voltage threshold of the second binary receiver to a third value for detecting the current amplitudes of the signal states during data transfer phases.

15. The transceiver of claim 14, wherein the first value of the first voltage threshold corresponds to a current amplitude between the current amplitudes of the first and third signal states, the second value of the second voltage threshold corresponds to a current amplitude between the current amplitudes of the second and third signal states and the third value of the third voltage threshold corresponds to a current amplitude between the current amplitudes of the first and second signals states.

16. The transceiver of claim 15, wherein the ratio of the outputs of the first common mode level shifting circuit is controlled to set the first voltage threshold of the first binary receiver during data transfer phases to the first value, the first binary receiver forming a preemptive signaling receiver for detecting a preemptive message driven on the bus by the first transceiver of the second node when a data transfer phase comprising the transfer of data signals from the first node to the second node is to be terminated for the transmission of priority control signals.

17. The transceiver of claim 14, wherein the bus comprises a differential serial bus having at least one pair of first and second twisted signal wires and the common mode voltage translator of each common mode level shifting circuit further comprises first and second PNP transistors disposed in parallel having emitters coupled to a common voltage bias and collectors coupled to a common ground, the first PNP transistor having a base coupled to the first signal wire and the second PNP transistor having a base coupled to the second signal wire, the first and second current sources coupled between the common voltage bias and the emitters of the first and second PNP transistors, respectively, with first and second outputs of the first and second current sources for each of the first and second common mode level shifting circuits coupled to first and second inputs of the first and second binary receivers, respectively.

18. The transceiver of claim 17, wherein the ratio of the outputs of the first and second current sources of each of the first and second common mode level shifting circuits is controlled to be proportional to a detected temperature for compensating variations in base-emitter junction voltages of the first and second PNP transistors caused by variations in the detected temperature.

19. The transceiver of claim 11, wherein the logic circuit comprises at least a first multiplexor and a second multiplexor, the first multiplexor receiving as input binary values output by the binary receivers and outputting logic states representing the bus states formed on the bus during control transfer phases, the second multiplexor receiving the logic states output by the first multiplexor in addition to the signal states driven on the bus by the first transceiver of the first node and outputting partially decoded logic states representing the control signals driven by the first transceiver of the second node.

20. The transceiver of claim 19, wherein the first and second binary receivers comprise first and second voltage comparators, respectively, the first voltage comparator outputting a first binary value when the resultant current amplitude is greater than or equal to the first voltage threshold and a second binary value when the resultant current amplitude is less than the first voltage threshold, the second voltage comparator outputting the first binary value when the resultant current amplitude is greater than or equal to the second voltage threshold and the second binary value when the resultant current amplitude is less than the second voltage threshold.

21. The transceiver of claim 20, wherein the first multiplexor of the logic circuit outputs a first logic state when two first binary values are input to the first multiplexor, a second logic state when two second binary values are input to the first multiplexor and a third logic state when the first binary value and the second binary value are input to the first multiplexor.

22. The transceiver of claim 21, wherein the second multiplexor of the logic circuit outputs the second signal state in response to an input of the second logic state and the second signal state, outputs the second signal state in response to an input of the third logic state and the first signal state, outputs the second signal state in response to an input of the second logic state and the third signal state, outputs the first signal state in response to an input of the third logic state and the second signal state, outputs the first signal state in response to an input of the first logic state and the first signal state, outputs the first signal state in response to an input of the first logic state and the third signal state, outputs the second signal state in response to an input of the second logic state and the third signal state, outputs the first signal state in response to an input of the first logic state and the third signal state and outputs the third signal state in response to an input of the third logic state and the third signal state.

23. The transceiver of claim 11, further comprising a system coupled by said bus wherein each of the first and second nodes further comprise a second transceiver identical to the first transceiver, the first transceiver of the first node coupled to the first transceiver of the second node via a first transmission channel of the bus, the second transceiver of the first node coupled to the second transceiver of the second node via a second transmission channel of the bus, the first and second transmission channels conveying data signals and reference clock signals, respectively, during a first data transfer phase where data is transferred from the first node to the second node, the first and second transmission channels conveying reference clock signals and data signals, respectively, during a second data transfer phase where data is transferred from the second node to the first node, both the first and second transmission channels further conveying control signals during a control transfer phase where control signals are simultaneously transferred between the nodes.

24. The system of claim 23, wherein each of the first and second common mode level shifting circuits of each transceiver comprises a common mode voltage translator having first and second current sources for varying the thresholds of the first and second binary receivers, the first and second current sources of each common mode level shifting circuits having outputs such that a ratio of the outputs of the first common mode level shifting circuit is controlled to set the first voltage threshold of the first binary receiver during control transfer phases to a first value and a ratio of the outputs of the second common mode level shifting circuit is controlled to set the second voltage threshold of the second binary receiver during control transfer phases to a second value for detecting the resultant current amplitudes formed on the bus during control transfer phases, the ratio of the outputs of the current sources of the second common mode level shifting circuit being controlled to set the second voltage threshold of the second binary receiver to a third value for detecting the current amplitudes of the signal states during data transfer phases, the first voltage threshold of the first binary receiver of each the first transceiver of the second node and the second transceiver of the first node being maintained at the first value during data transfer phases for detecting a preemptive message driven on the first and second transmission channels by the first transceiver of the first node and the second transceiver of the second node when the second and first data transfer phases, respectively, are to be terminated for the transmission of priority control signals, the first binary receiver of the second transceiver of the first node and the first transceiver of the second node outputting to the driver of the first transceiver of the first node and the driver of the second transceiver of the second node, respectively, a disable signal for disabling the respective drivers upon detection of the preemptive message.

25. The system of claim 24, wherein the preemptive message comprises a signal state having a positive current amplitude for increasing a current amplitude of the reference clock signal transmitted on the first and second transmission channels during second and first data transfer phases, respectively, the preemptive signaling receivers each comprising a third voltage comparator having a third voltage threshold for outputting the disable signal upon detection of an increase in the current amplitude of the reference clock signal.

26. The system of claim 24, wherein the first value of the first voltage threshold corresponds to a current amplitude between the current amplitudes of the first and third signal states, the second value of the second voltage threshold corresponds to a current amplitude between the current amplitudes of the second and third signal states and the third value of the third voltage threshold corresponds to a current amplitude between the current amplitudes of the first and second signals states.

27. The system of claim 24, wherein the bus comprises a differential serial bus and wherein the first and second transmission channels of the bus each comprise one pair of first and second twisted signal wires, the common mode voltage translator of each common mode level shifting circuit of each transceiver further comprising first and second PNP transistors disposed in parallel having emitters coupled to a common voltage bias and collectors coupled to a common ground, the first PNP transistor having a base coupled to the first signal wire and the second PNP transistor having a base coupled to the second signal wire of the respective transmission channels, the first and second current sources coupled between the common voltage bias and the emitters of the first and second PNP transistors, respectively, with first and second outputs of the first and second current sources for each of the first and second common mode level shifting circuit coupled to first and second inputs of the respective binary receivers.

28. The system of claim 27, wherein the ratio of the outputs of the first and second current sources of each of the first and second common mode level shifting circuits is controlled to be proportional to a detected temperature for compensating variations in base-emitter junction voltages of the first and second PNP transistors caused by variations in the detected temperature.

* * * * *